(No Model.)
J. E. WHITE.
BAIL EAR FOR CAKE BASKETS, &c.
No. 443,213. Patented Dec. 23, 1890.
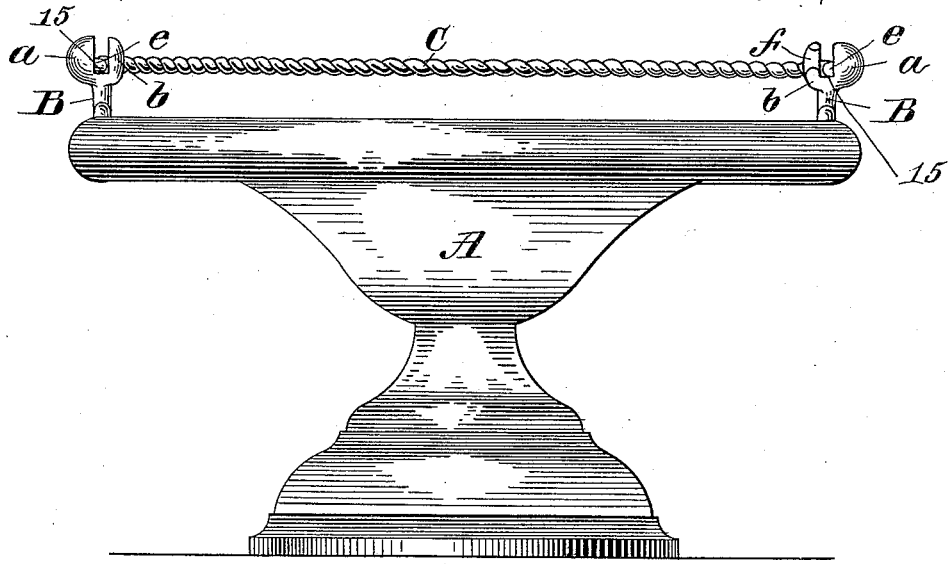
Fig. 1.
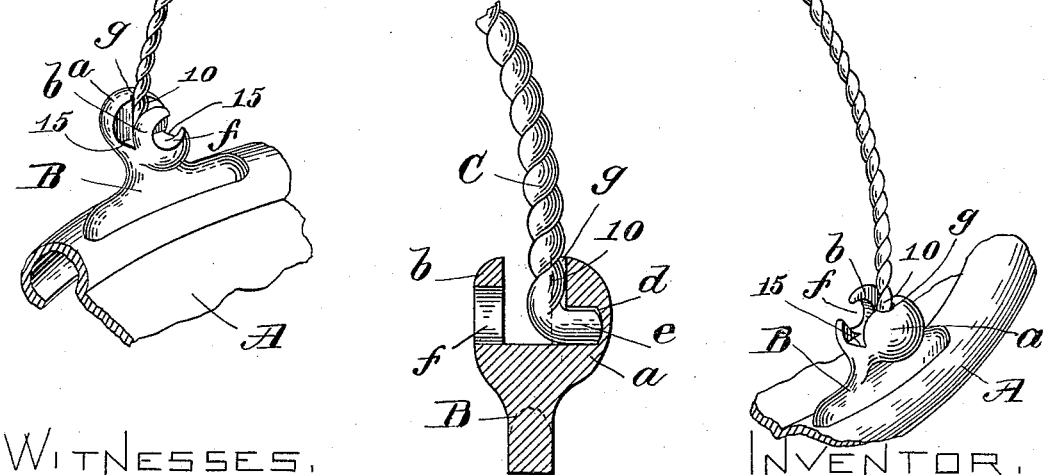
Fig. 2.
Fig. 3.
Witnesses,
Henry Marsh.
Harry S. Asken.
Inventor,
James E. White
By P. C. Teschemacher
Atty.

UNITED STATES PATENT OFFICE.

JAMES E. WHITE, OF MALDEN, ASSIGNOR TO JAMES W. TUFTS, OF MEDFORD, MASSACHUSETTS.

BAIL-EAR FOR CAKE-BASKETS, &c.

SPECIFICATION forming part of Letters Patent No. 443,213, dated December 23, 1890.

Application filed October 16, 1890. Serial No. 368,354. (No model.)

*To all whom it may concern:*

Be it known that I, JAMES E. WHITE, a citizen of the United States, residing at Malden, in the county of Middlesex and State of Massachusetts, have invented certain Improvements in Devices for Attaching Bails or Swinging Handles to Cake-Baskets and other Receptacles, of which the following is a full, clear, and exact description, reference being had to the accompanying drawings, making part of this specification, in which—

Figure 1 is a side elevation of a cake-basket having its bail-handle attached thereto in accordance with my invention. Fig. 2 is a perspective view of the handle, the two ears, and the portions of the rim of the basket to which the ears are attached. Fig. 3 is a vertical section through one of the ears, showing one end of the handle in place therein.

My invention relates particularly to the construction of the ears or projections, to which are pivoted the swinging or bail handles of cake-baskets and other receptacles, and has for its object the attachment of the handle in such manner that while it can be easily removed when desired for cleaning or other purposes it will be impossible for it to become detached in the ordinary use or handling of the basket or other receptacle to which it is applied.

Heretofore the swinging handles of cake-baskets have been usually attached to their ears by means of short bolts or rivets. This necessitates in ordinary plated ware, usually composed of soft metal, the introduction of a brass bushing both in the ear and in the end of the handle pivoted thereto, in order to prevent the parts from becoming loose by wear, which adds materially to the cost of the article, and where a wire handle is used a thick piece of soft metal to receive the bushing must be soldered to each end of the handle, thus still further increasing the cost. Furthermore, in the operation of riveting the handle to the ear, which must be done after the article is plated, the end of the rivet and the bushing often become slightly marred or defaced by the blows of the hammer, which is a serious objection and injures the finish and appearance of the article. These objections are all overcome by my invention, which consists in a handle-ear provided with a hole or recess for the reception of the outwardly-bent end of the handle, and having an inside guard or projection for retaining the end of the handle within said hole or recess, said guard having a slot or opening, which will permit the handle when brought into line therewith to be detached from or attached to the ear, as hereinafter set forth.

In the said drawings, A represents a cake-basket, provided on the opposite sides of its upper edge or rim with two ears B B, to which are pivotally attached the ends of a swinging handle or bail C.

Each of the ears B is composed of two portions $a\ b$, the outer portion $a$ being provided on the inner side with a hole or recess $d$ for the reception of the outwardly-turned end $e$ of the handle C, which is preferably composed of spring-wire to permit the ends $e$ to be sprung into and out of place. The end portion 10 of the handle fits between the two portions $a\ b$ of the ear, and is free to move therein as the handle is swung up and down. The bottom of the space between the two portions $a\ b$ forms a stop 15 on each side of the ear, against which the handle strikes when brought down on either side, thus limiting its movement and preventing its central portion from coming into contact with and marring the edge or rim of the basket.

The inner portion $b$ of the ear projects up above the level of the recess $d$ and serves as a guard to prevent the end of the handle from being sprung out of its recess, except when turned into a position to bring it opposite to or in line with an open slot $f$ in the guard $b$, which slot is preferably so inclined that when the handle is to be detached it will have to be placed at an angle of about forty-five degrees, which position is not one in which it would ordinarily be placed. Hence the liability of the handle becoming accidentally detached is reduced to a minimum.

The slot or opening $f$ of one ear B is preferably inclined in exactly the opposite direction to that of the other ear, as seen in Fig. 2, which arrangement necessitates the moving of the handle into two different positions to effect the disengagement of both of its ends, thus still further guarding against any accidental detachment of the handle from the basket.

The outer portion $a$ of each ear is provided on its inner side with a vertical groove or notch $g$, into which the end 10 of the handle springs when raised into an upright position, as seen in Figs. 2 and 3, the handle being thus retained in a convenient position to be grasped by the hand when required, while a slight pressure exerted to swing the handle down on either side will cause its ends to readily spring out of and be released from the notches $g$.

With my improved ear no rivets or bushings are required, thus simplifying the construction, and furthermore the employment in cake-baskets, &c., of a wire handle having outwardly-bent ends sprung into holes or recesses in the ears, as shown, which is rendered practicable by the use of ears constructed in accordance with my invention, is a great advantage, as it materially reduces the number of solderings, there being no rivets and consequently no bushings, either in the ears or in the ends of the handle as was necessary with the old construction, while the handle can be readily detached whenever required for cleaning or other purposes.

Although my improved handle-ears are particularly well adapted for cake-baskets, it is obvious that they may be applied equally as well to pails or other receptacles to which it is desired to attach a swinging handle or bail in such manner that it can be readily removed when required.

What I claim as my invention, and desire to secure by Letters Patent, is—

1. In a cake-basket or other receptacle, a handle-ear having an outer portion provided with a hole or recess for the reception of the outwardly-bent end of the bail or handle, combined with an inside guard or projection forming part of said ear and extending up above the said hole or recess to retain the end of the handle therein, said guard having a slot or opening through which the handle, when in line therewith, may be withdrawn or sprung out of its hole or recess in the outer portion of the ear and detached from the same, substantially as set forth.

2. The combination, with a cake-basket or other receptacle having two ears, each composed of an outer portion $a$, having a hole or recess for the reception of the outwardly-bent end of the bail or handle C, and an inner portion or guard $b$, adapted to retain the end of the handle within its hole or recess, and having a slot or opening $f$ to permit of the withdrawal of the handle when in line therewith, said slots $f$ being inclined in opposite directions, whereby the bail or handle must be placed in two different positions to effect its detachment from both of the said ears, substantially as set forth.

3. In a cake-basket or other receptacle, a handle-ear B, composed of an outer portion $a$, provided with a hole or recess into which the outwardly-bent end of the handle is forced by its own elasticity, and the slotted inner portion or guard $b$, said outer portion $a$ being provided on its inner side with a central vertical groove or notch $g$, adapted to receive and retain the handle in place when raised into a vertical position, substantially as set forth.

4. In a cake-basket, a handle-ear B, composed of the outer portion $a$ and the slotted inside guard $b$, and provided on opposite sides with stops to prevent the contact of the central portion of the handle with the rim or edge of the basket or receptacle, substantially as set forth.

Witness my hand this 11th day of October, A. D. 1890.

JAMES E. WHITE.

In presence of—
P. E. TESCHEMACHER,
GEO. C. HILL.